United States Patent
Ghosh et al.

(10) Patent No.: US 9,480,097 B1
(45) Date of Patent: Oct. 25, 2016

(54) AUTOMATIC ENABLING OR DISABLING OF AUTO-NEGOTIATION BETWEEN NETWORK DEVICES

(71) Applicant: Juniper Networks, Inc., Sunnyvale, CA (US)

(72) Inventors: Shubhadeep Ghosh, Bangalore (IN); Anand Vardhan, Bangalore (IN); Puneet Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 187 days.

(21) Appl. No.: 14/497,610

(22) Filed: Sep. 26, 2014

(51) Int. Cl.
*H04W 4/00* (2009.01)
*H04W 76/02* (2009.01)
*H04W 76/06* (2009.01)
*H04W 88/12* (2009.01)

(52) U.S. Cl.
CPC ......... *H04W 76/027* (2013.01); *H04W 76/028* (2013.01); *H04W 76/068* (2013.01); *H04W 88/12* (2013.01)

(58) Field of Classification Search
CPC ...... H04W 88/08; H04W 84/18; H04L 29/06
See application file for complete search history.

(56) References Cited

U.S. PATENT DOCUMENTS

| | | | | |
|---|---|---|---|---|
| 2002/0039354 | A1* | 4/2002 | Chen | H04L 5/1438 370/296 |
| 2013/0170395 | A1* | 7/2013 | Jeon | H04L 49/3054 370/254 |
| 2015/0229588 | A1* | 8/2015 | Pillai | H04L 49/3054 370/437 |

OTHER PUBLICATIONS

Wikipedia, "Autonegotiation," http://en.wikipedia.org/wiki/Autonegotiation, Jul. 24, 2014, 7 pages.
Wikipedia, "IEEE 802.3," http://en.wikipedia.org/wiki/IEEE_802.3, Jul. 15, 2014, 4 pages.

* cited by examiner

*Primary Examiner* — Charles C Jiang
*Assistant Examiner* — Thad Defauw
(74) *Attorney, Agent, or Firm* — Harrity & Harrity, LLP

(57) ABSTRACT

A first network device may determine a first auto-negotiation capability associated with the first network device. The first auto-negotiation capability may indicate whether the first network device is configured to establish a communication link with a second network device using auto-negotiation of transmission capabilities. The first network device may determine a second auto-negotiation capability associated with the second network device. The second auto-negotiation capability may indicate whether the second network device is configured to establish the communication link with the first network device using auto-negotiation of the transmission capabilities. The first network device may determine that an auto-negotiation process failed to establish the communication link between the first network device and the second network device. The first network device may enable or disable auto-negotiation on the first network device based on determining that the auto-negotiation process failed, and based on the first auto-negotiation capability and the second auto-negotiation capability.

20 Claims, 9 Drawing Sheets

AUTOMATIC ENABLING OR DISABLING OF AUTO-NEGOTIATION BETWEEN NETWORK DEVICES

BACKGROUND

Auto-negotiation may refer to a procedure by which two connected network devices choose common transmission parameters, such as speed, duplex mode, flow control, or the like. In this process, the network devices first share their capabilities regarding these transmission parameters, and then choose the highest performance transmission mode that both network devices support.

SUMMARY

According to some possible implementations, a first network device may determine a first auto-negotiation capability associated with the first network device. The first auto-negotiation capability may indicate whether the first network device is configured to establish a communication link with a second network device using auto-negotiation of one or more transmission capabilities. The first network device may determine a second auto-negotiation capability associated with the second network device. The second auto-negotiation capability may indicate whether the second network device is configured to establish the communication link with the first network device using auto-negotiation of the one or more transmission capabilities. The first network device may determine that an auto-negotiation process failed to establish the communication link between the first network device and the second network device. The first network device may selectively enable or disable auto-negotiation on the first network device based on determining that the auto-negotiation process failed, and further based on the first auto-negotiation capability and the second auto-negotiation capability.

According to some possible implementations, a computer-readable medium may store instructions that, when executed by a processor, cause the processor to receive, from a remote network device, a remote auto-negotiation capability indicator. The remote auto-negotiation capability indicator may indicate whether the remote network device is configured to establish communication links with other network devices using auto-negotiation. The instructions may cause the processor to store the remote auto-negotiation capability indicator as a stored remote auto-negotiation capability indicator. The instructions may cause the processor to determine that an auto-negotiation process failed to establish a communication link with the remote network device. The instructions may cause the processor to selectively enable or disable auto-negotiation based on determining that the auto-negotiation process failed, and further based on the stored remote auto-negotiation capability indicator. The instructions may cause the processor to perform a link establishment process with the remote network device after selectively enabling or disabling auto-negotiation. The link establishment process may include auto-negotiation when auto-negotiation has been enabled, or the link establishment process may not include auto-negotiation when auto-negotiation has been disabled.

According to some possible implementations, a method may include determining, by a first network device, a first auto-negotiation capability associated with the first network device. The first auto-negotiation capability may indicate whether the first network device is configured to establish communication links using auto-negotiation of transmission capabilities. The method may include determining, by the first network device, a second auto-negotiation capability associated with a second network device that is connected to the first network device. The second auto-negotiation capability may indicate whether the second network device is configured to establish communication links using auto-negotiation of transmission capabilities. The method may include determining, by the first network device, that an auto-negotiation process has failed to establish a communication link between the first network device and the second network device. The method may include selectively enabling or disabling, by the first network device, auto-negotiation on the first network device based on determining that the auto-negotiation process has failed, and further based on the first auto-negotiation capability and the second auto-negotiation capability. The method may include performing, by the first network device, a link establishment process, to establish the communication link between the first network device and the second network device, based on selectively enabling or disabling auto-negotiation.

DETAILED DESCRIPTION

The following detailed description of example implementations refers to the accompanying drawings. The same reference numbers in different drawings may identify the same or similar elements.

Auto-negotiation may refer to a procedure by which two network devices (e.g., switches, routers, etc.) exchange transmission capabilities, such as speed, duplex mode, flow control, or the like, and decide which transmission capabilities to use for communications between the network devices (e.g., based on common transmission capabilities). Example transmission capabilities may include a speed supported by a network device (e.g., 10-Gigabit, 40-Gigabit, 100-Gigabit, etc.), a duplex mode supported by the network device (e.g., full-duplex, half-duplex, etc.), a flow control mechanism supported by the network device (e.g., stop-and-wait, sliding window, etc.), a fault management mechanism supported by the network device, or the like. Some network devices may not support auto-negotiation, or may be configured to disable auto-negotiation. A first network device with auto-negotiation enabled may have difficulty establishing a communication link with a second network device that does not support auto-negotiation or that has disabled auto-negotiation. Implementations described herein assist in establishing communication links between network devices with different auto-negotiation capabilities or settings by automatically enabling or disabling auto-negotiation on a network device as appropriate.

Figure 1:
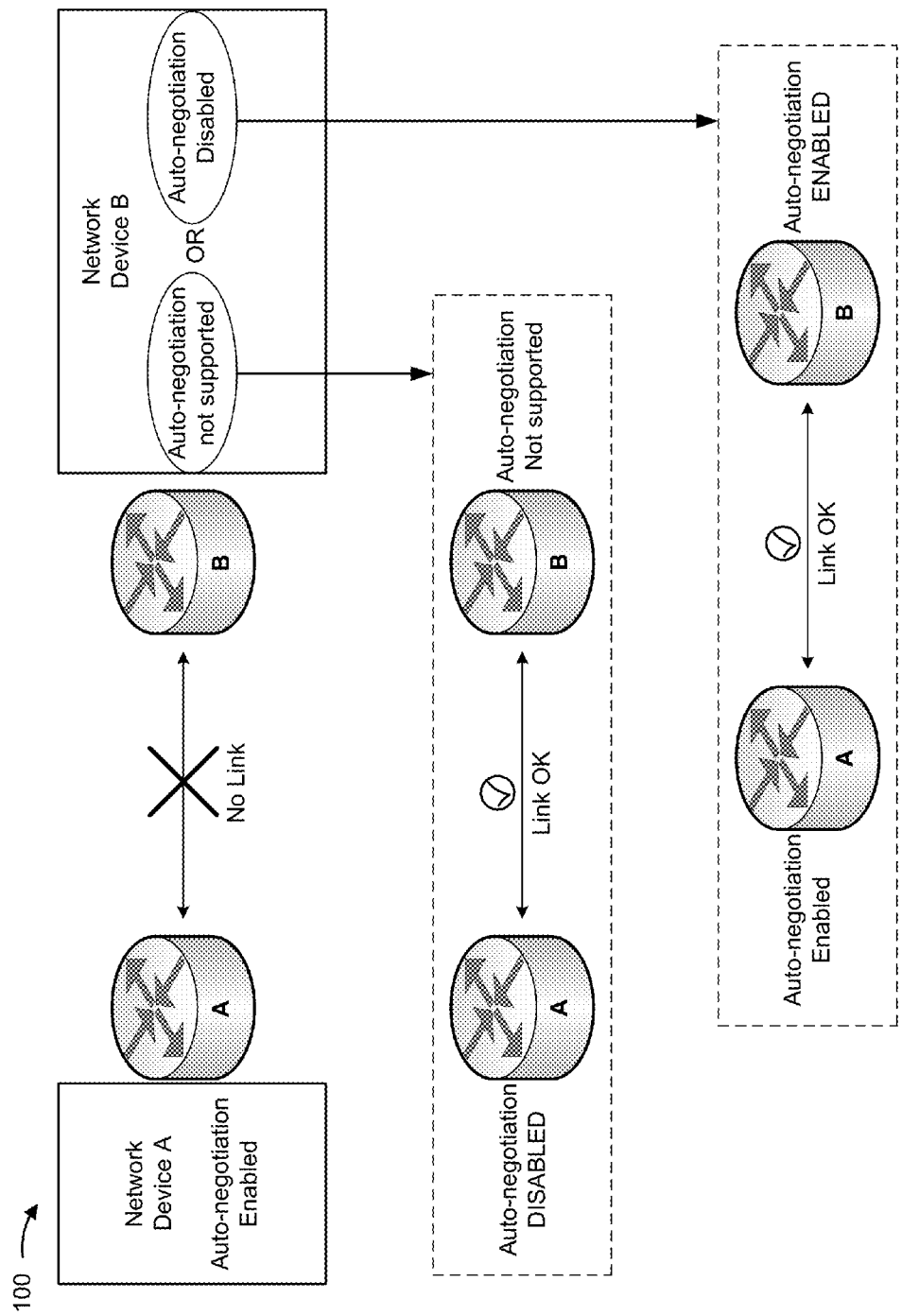
FIG. 1 is a diagram of an overview of an example implementation described herein.

FIG. 1 is a diagram of an overview of an example implementation 100 described herein. As shown in FIG. 1, assume that a first network device (e.g., a router), shown as network device A, has an auto-negotiation capability, and that the auto-negotiation capability is enabled. As further shown, assume that a second network device (e.g., another router), shown as network device B, either does not have an auto-negotiation capability (e.g., auto-negotiation is not supported) or has an auto-negotiation capability that has been disabled. As a result, assume that network device A and network device B are having difficulty communicating, and that a link cannot be established between the two network devices, as shown.

As further shown in FIG. 1, in the case where network device B does not support auto-negotiation, network device A may employ a technique described herein to automatically disable auto-negotiation. Once network device A has disabled auto-negotiation, network device A and network device B may be able to establish a communication link, as shown.

As further shown in FIG. 1, in the case where network device B has disabled auto-negotiation, network device B may employ a technique described herein to automatically enable auto-negotiation. Once network device B has enabled auto-negotiation, network device A and network device B may be able to establish a communication link because both network devices have enabled auto-negotiation, as shown. In this way, network devices with different auto-negotiation capabilities (e.g., supported vs. not supported) or settings (e.g., enabled vs. disabled) may be able to establish a link after automatically enabling or disabling auto-negotiation.

Figure 2:
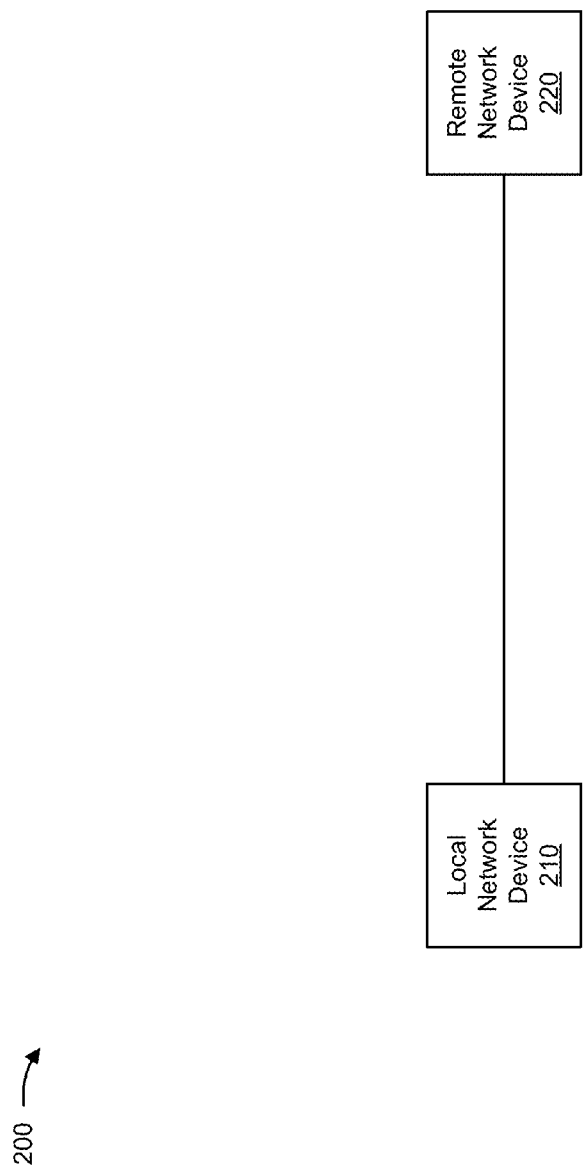
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a local network device 210 and a remote network device 220. Devices of environment 200 may interconnect via a wired connection, in some implementations.

Local network device 210 may include one or more devices (e.g., one or more traffic transfer devices) capable of processing and/or transferring traffic between endpoint devices. For example, local network device 210 may include a network device, such as a router, a gateway, a switch, a hub, a bridge, a firewall a reverse proxy, a server (e.g., a proxy server), a security device, an intrusion detection device, a load balancer, or a similar type of device. In some implementations, local network device 210 may include a network device with an auto-negotiation capability, which may be enabled or disabled for use by local network device 210. Alternatively, local network device 210 may include a network device without an auto-negotiation capability.

Remote network device 220 may include one or more devices (e.g., one or more traffic transfer devices) capable of processing and/or transferring traffic between endpoint devices. For example, remote network device 220 may include a network device, such as a router, a gateway, a switch, a hub, a bridge, a firewall a reverse proxy, a server (e.g., a proxy server), a security device, an intrusion detection device, a load balancer, or a similar type of device. In some implementations, remote network device 220 may include a network device with an auto-negotiation capability, which may be enabled or disabled for use by remote network device 220. Alternatively, remote network device 220 may include a network device without an auto-negotiation capability. In some implementations, local network device 210 and/or remote network device 220 may have an auto-negotiation capability. Additionally, or alternatively, local network device 210 and remote network device 220 may include different types of network devices, different versions of network devices, devices with different auto-negotiation capabilities, or the like.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
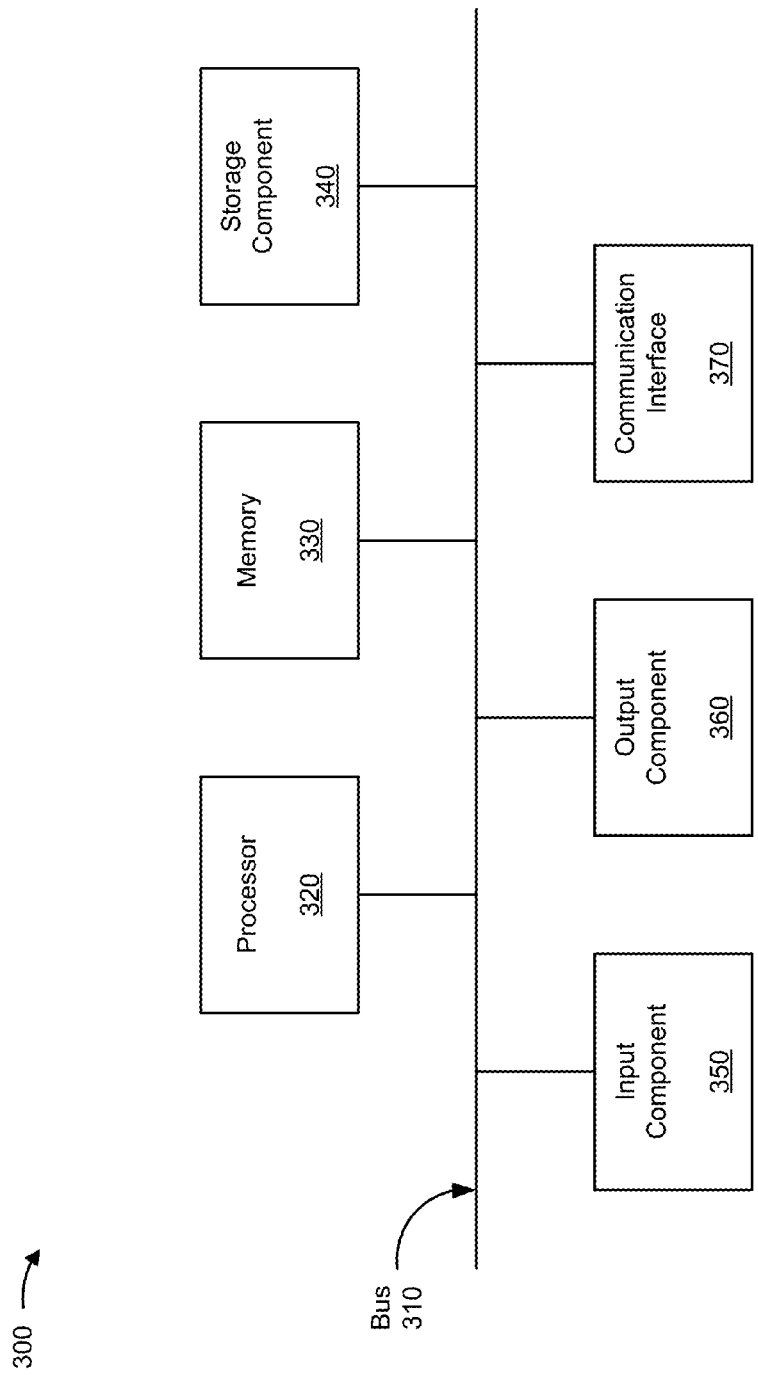
FIG. 3 is a diagram of example components of one or more devices of FIG. 2.

FIG. 3 is a diagram of example components of a device 300. Device 300 may correspond to local network device 210 and/or remote network device 220. In some implementations, local network device 210 and/or remote network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
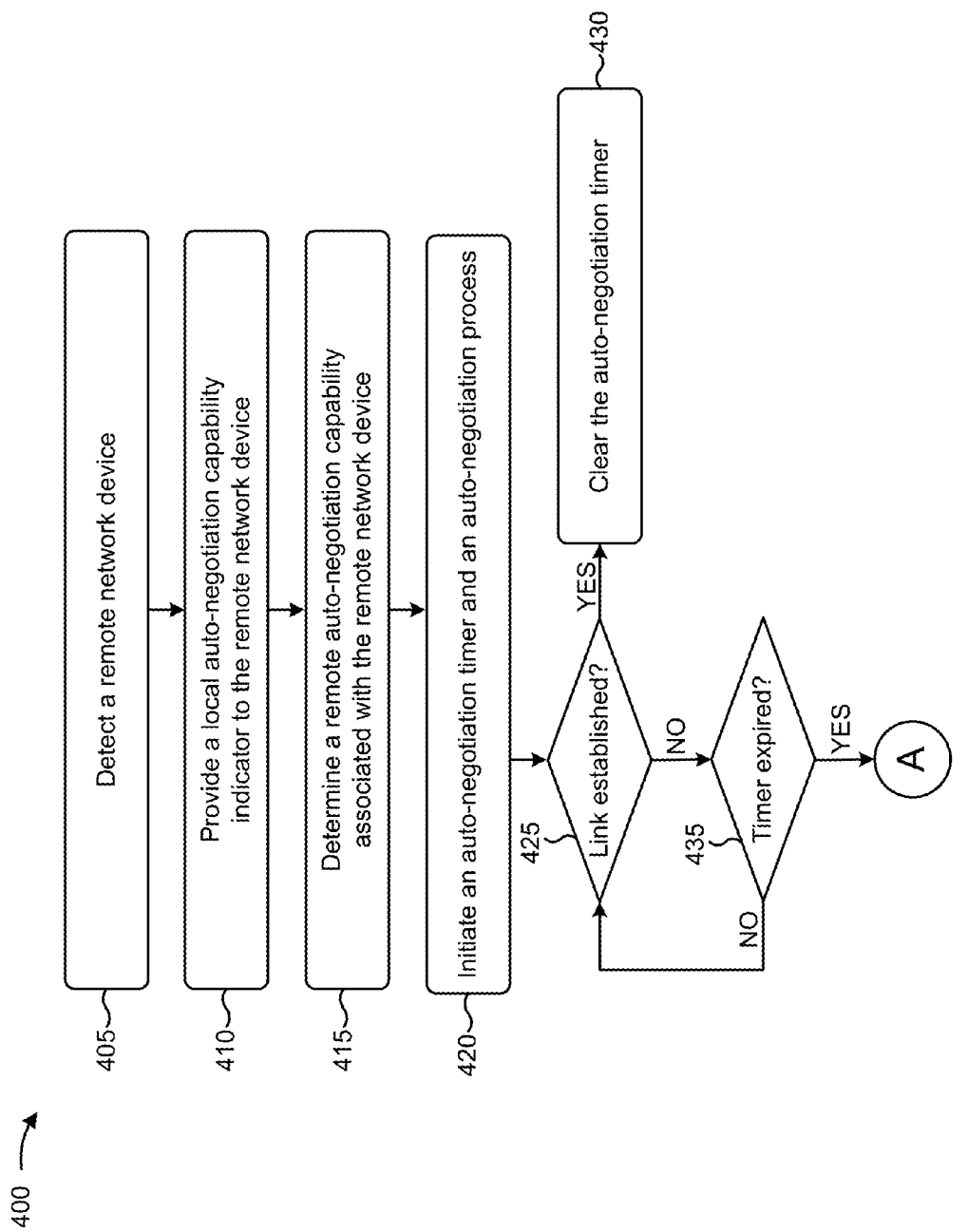
FIGS. 4A and 4B are flow charts of an example process for automatic enabling or disabling of auto-negotiation between network devices.
Figure 4B:
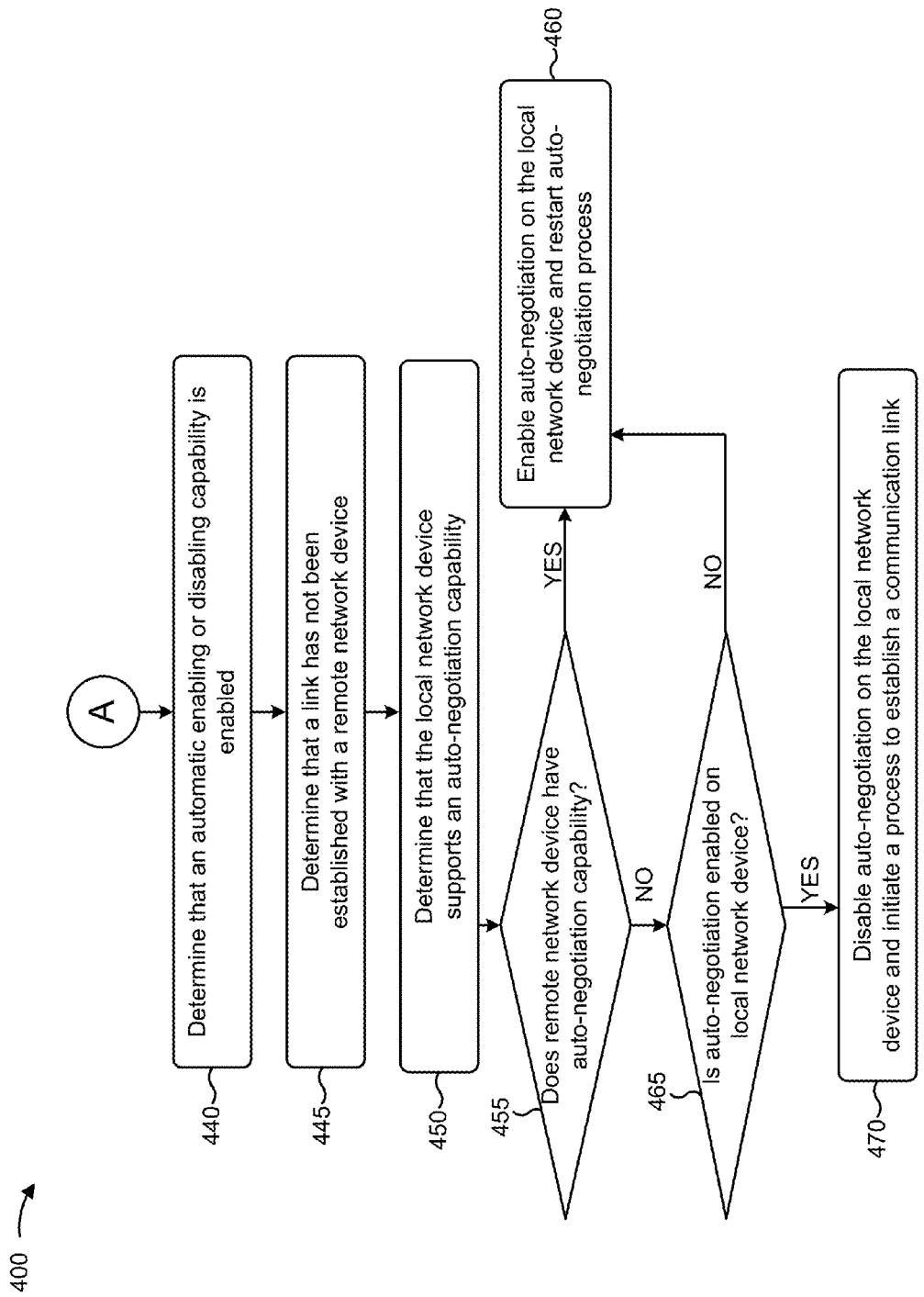

FIGS. 4A and 4B are flow charts of an example process 400 for automatic enabling or disabling of auto-negotiation between network devices. In some implementations, one or more process blocks of FIG. 4A and/or FIG. 4B may be performed by local network device 210. In some implementations, one or more process blocks of FIG. 4A and/or FIG. 4B may be performed by another device or a group of devices separate from or including local network device 210, such as remote network device 220.

As shown in FIG. 4A, process 400 may include detecting a remote network device (block 405). For example, local network device 210 may detect remote network device 220. In some implementations, local network device 210 may detect a wired connection with remote network device 220 (e.g., via an Ethernet cable, a fiber-optic cable, etc.). Local network device 210 and remote network device 220 may exchange information, via the connection (e.g., via a physical layer), to attempt to establish a communication link between local network device 210 and remote network device 220 (e.g., on a link layer, such as via an Ethernet protocol). The communication link may be a link between a port on local network device 210 and a port on remote network device 220, in some implementations.

As further shown in FIG. 4A, process 400 may include providing a local auto-negotiation capability indicator to the remote network device (block 410). For example, local network device 210 may identify a local auto-negotiation capability of local network device 210, and may provide information that identifies the local auto-negotiation capability to remote network device 220. Local network device 210 may identify the local auto-negotiation capability by determining whether local network device 210 supports and/or is capable of supporting auto-negotiation. Additionally, or alternatively, local network device 210 may determine the local auto-negotiation capability based on information stored in memory, such as a register (e.g., local to local network device 210).

Local network device 210 may provide a local auto-negotiation capability indicator, that indicates whether local network device 210 supports and/or is capable of supporting auto-negotiation, to remote network device 220. For example, local network device 210 may provide the indicator (e.g., "local_an_capability") with a first value (e.g., 0) when local network device 210 does not support auto-negotiation, and may provide the indicator with a second value (e.g., 1) when local network device 210 supports auto-negotiation. In some implementations, when local network device 210 does not support auto-negotiation, local network device 210 may not provide a local auto-negotiation capability indicator to remote network device 220.

As further shown in FIG. 4A, process 400 may include determining a remote auto-negotiation capability associated with the remote network device (block 415). For example, local network device 210 may determine a remote auto-negotiation capability associated with remote network device 220. In some implementations, remote network device 220 may identify an auto-negotiation capability of remote network device 220 (e.g., local to remote network device 220). Remote network device 220 may provide an auto-negotiation capability indicator, that indicates whether remote network device 220 supports and/or is capable of supporting auto-negotiation, to local network device 210 (e.g., in a similar manner as described above in connection with block 410). Local network device 210 may receive the auto-negotiation capability indicator from remote network device 220, and may store a remote auto-negotiation capability indicator that identifies whether remote network device 220 supports and/or is capable of supporting auto-negotiation.

For example, local network device 210 may store a first value (e.g., 0) for the indicator (e.g., "remote_an_capability") when remote network device 220 does not support auto-negotiation, and may store a second value (e.g., 1) for the indicator when remote network device 220 supports auto-negotiation. In some implementations, when local network device 210 does not receive an auto-negotiation capability indicator from remote network device 220, local network device 210 may assume that remote network device 220 does not support auto-negotiation, and may store the second value for the indicator.

In this way, local network device 210 may store a local auto-negotiation capability indicator that indicates whether local network device 210 supports auto-negotiation, and may store a remote auto-negotiation capability indicator, associated with remote network device 220 with which local network device 210 is attempting to establish a communication link, that indicates whether remote network device 220 supports auto-negotiation.

As further shown in FIG. 4A, process 400 may include initiating an auto-negotiation timer and an auto-negotiation process (block 420). For example, local network device 210 may initiate an auto-negotiation timer and an auto-negotiation process. Local network device 210 may initiate the auto-negotiation timer when the auto-negotiation process is initiated. The auto-negotiation process may include a process of exchanging information, between local network device 210 and remote network device 220, that identifies transmission capabilities of local network device 210 and remote network device 220. Additionally, or alternatively, the auto-negotiation process may include a process of determining which transmission capabilities to use for a communication link between local network device 210 and remote network device 220. Additionally, or alternatively, the auto-negotiation process may include a process of establishing a communication link between local network device 210 and remote network device 220 (e.g., based on determined transmission capabilities). In some implementations, local network device 210 may initiate the auto-negotiation process by initiating an auto-negotiation state machine (e.g., by entering an "AN_ENABLE" state of the state machine).

Local network device 210 may initialize the auto-negotiation timer to a particular value (e.g., 100 milliseconds, 1 second, 5 seconds, etc.). In some implementations, the auto-negotiation timer may be set to a default value (e.g., based on an expected length of time for the auto-negotiation process to complete). Local network device 210 may use the auto-negotiation timer to keep track of an amount of time that has elapsed since the auto-negotiation process was initiated.

As further shown in FIG. 4A, process 400 may include determining whether a communication link has been established (block 425). For example, local network device 210 may determine whether a communication link has been established between local network device 210 and remote network device 220 (e.g., based on executing the auto-negotiation process). Local network device 210 may determine whether the communication link was successfully established based on whether information was successfully provided to remote network device 220, whether information was successfully received from remote network device 220, an indication of whether a three-way handshake between local network device 210 and remote network device 220 was successful, an indication of whether a communication link on the link layer has been established, an indication of whether an attempt to establish a communication link resulting in an error, or the like.

As further shown in FIG. 4A, if the communication link has been established (block 425—YES), then process 400 may include clearing the auto-negotiation timer (block 430). For example, if local network device 210 determines that the communication link with remote network device 220 has been successfully established, then local network device 210 may clear the auto-negotiation timer (e.g., may stop the timer). In this case, since the communication link has been successfully established (e.g., via an auto-negotiation process), local network device 210 and/or remote network device 220 may not need to perform automatic enabling or disabling of auto-negotiation to establish the communication link.

As further shown in FIG. 4A, if the communication link has not been established (block 425—NO), then process 400 may include determining whether the auto-negotiation timer has expired (block 435). For example, if local network device 210 determines that the communication link with remote network device 220 has not been successfully established, then local network device 210 may determine whether the auto-negotiation timer has expired. As an example, local network device 210 may determine whether the auto-negotiation timer has expired based on a current value of the auto-negotiation timer (e.g., by comparing the auto-negotiation timer value to a threshold value, by determining that the auto-negotiation timer has reached a particular value, or the like).

As further shown in FIG. 4A, if the auto-negotiation timer has not expired (block 435—NO), then process 400 may include returning to block 425. For example, if local network device 210 determines that the auto-negotiation timer has not expired, then local network device 210 may continue to use the auto-negotiation timer to keep track of an amount of time that has elapsed since the auto-negotiation process was initialized. Additionally, or alternatively, local network device 210 may continue to monitor a connection with remote network device 220 to determine whether a communication link has been established on the connection (e.g., using the auto-negotiation process).

As further shown in FIG. 4A, and as shown in FIG. 4B, if the auto-negotiation timer has expired (block 435—YES), then process 400 may include determining that an automatic enabling or disabling capability is enabled (block 440). For example, if local network device 210 determines that the auto-negotiation timer has expired, then local network device 210 may determine that the auto-negotiation process has failed. In this case, local network device 210 may determine whether an automatic enabling/disabling capability of local network device 210 is enabled. If this capability is enabled, then local network device 210 may perform automatic enabling or disabling of auto-negotiation. If this capability is not enabled, then local network device 210 may not perform automatic enabling or disabling of auto-negotiation. In this case, local network device 210 may not be able to establish a communication link with remote network device 220. In some implementations, a user may configure local network device 210 to enable or disable (e.g., permit or deny) automatic enabling or disabling of auto-negotiation.

In some implementations, local network device 210 may store a first value (e.g., 0) for an automatic enabling/disabling indicator (e.g., "super_autoneg") when automatic enabling or disabling of auto-negotiation is disabled on local network device 210. Likewise, local network device 210 may store a second value (e.g., 1) for the automatic enabling/disabling indicator (e.g., "super_autoneg") when automatic enabling or disabling of auto-negotiation is enabled on local network device 210. In other words, local network device 210 may be configured to permit both automatic enabling and disabling of auto-negotiation, or may be configured not to permit either automatic enabling or disabling of auto-negotiation. Additionally, or alternatively, local network device 210 may be configured to permit only automatic enabling of auto-negotiation, or may be configured to permit only automatic disabling of auto-negotiation (e.g., based on a user preference).

As further shown in FIG. 4B, process 400 may include determining that a link has not been established with a remote network device (block 445). For example, local network device 210 may determine whether a communication link has been established between local network device 210 and remote network device 220, as described herein in connection with block 425. This may serve as an additional check to ensure that a communication link has not been established before proceeding with automatic enabling or disabling of auto-negotiation. If the communication link has been established, then local network device 210 may not need to perform automatic enabling or disabling of auto-negotiation to establish the communication link. In some implementations, a link status bit (e.g., stored in a media independent interface (MII) control register of local network device 210) may identify whether a link has been established (e.g., bit 13, which specifies a value for "link_status"). Local network device 210 may determine whether a communication link has been established based on the value of the link status bit. In other words, blocks 450-470 may only be performed when the communication link cannot be established using default settings.

As further shown in FIG. 4B, process 400 may include determining that the local network device supports an auto-negotiation capability (block 450). For example, local network device 210 may check to ensure that local network device 210 supports auto-negotiation before performing automatic enabling or disabling of auto-negotiation. If local network device 210 does not support auto-negotiation, then local network device 210 cannot enable or disable auto-negotiation.

As further shown in FIG. 4B, process 400 may include determining whether the remote network device has an auto-negotiation capability (block 455). For example, local network device 210 may request and/or receive a remote auto-negotiation capability indicator from remote network device 220, as described in connection with block 415. Local network device 210 may store the remote auto-negotiation capability indicator in memory, and may determine whether remote network device 220 has an auto-negotiation capability based on the stored remote auto-negotiation capability indicator.

For example, if a stored value for the remote auto-negotiation capability indicator is equal to a first value (e.g., 0), then local network device 210 may determine that remote network device 220 does not have an auto-negotiation capability. Conversely, if a stored value for the remote auto-negotiation capability indicator is equal to a second value (e.g., 1), then local network device 210 may determine that remote network device 220 has an auto-negotiation capability.

As further shown in FIG. 4B, if the remote network device has an auto-negotiation capability (block 455—YES), then process 400 may include enabling auto-negotiation on the local network device and restarting an auto-negotiation process (block 460). For example, if local network device 210 determines that remote network device 220 has an auto-negotiation capability, then local network device 210 may enable auto-negotiation locally, and may restart (e.g., re-initiate) an auto-negotiation process (e.g., described in connection with block 420). In some implementations, a restart bit (e.g., an auto-negotiation restart bit) of the MII control register of local network device 210 may be used to restart the auto-negotiation process (e.g., bit 7, which specifies a value for "an_restart"). Local network device 210 may restart auto-negotiation by setting a value of the restart bit (e.g., from 1, which may indicate that an auto-negotiation process has been initiated, to 0, which may indicate that the auto-negotiation process has not been initiated or that the auto-negotiation process should be restarted).

As an example, remote network device 220 may have auto-negotiation enabled, and local network device 210 may have auto-negotiation disabled. In this case, by enabling auto-negotiation locally (e.g., on local network device 210) and restarting the auto-negotiation process, local network device 210 may be able to successfully establish a communication link with remote network device 220 (e.g., by performing the auto-negotiation process with auto-negotiation enabled on both network devices).

As further shown in FIG. 4B, if the remote network device does not have an auto-negotiation capability (block 455—NO), then process 400 may include determining whether auto-negotiation is enabled on the local network device (block 465). For example, if local network device 210 determines that remote network device 220 does not have an auto-negotiation capability, then local network device 210 may determine whether auto-negotiation is enabled locally (e.g., on local network device 210). For example, local network device 210 may determine a stored value associated with an auto-negotiation enablement indicator (e.g., "an_config"). If the stored value is equal to a first value (e.g., 0), then local network device 210 may determine that auto-negotiation is disabled locally. If the stored value is equal to a second value (e.g., 1), then local network device 210 may determine that auto-negotiation is enabled locally.

In some implementations, local network device 210 may support auto-negotiation, but may be configured (e.g., based on user input, a configuration setting, etc.) to disable auto-negotiation. For example, an auto-negotiation configuration bit of the MII control register of local network device 210 may be used to enable or disable auto-negotiation (e.g., bit 4, which specifies a value for "an_config"). Local network device 210 may determine whether auto-negotiation is enabled based on the value of the auto-negotiation configuration bit.

As further shown in FIG. 4B, if auto-negotiation is not enabled on the local network device (block 465—NO), then process 400 may include enabling auto-negotiation on the local network device and restarting the auto-negotiation process (block 460). For example, if local network device 210 determines that auto-negotiation is disabled locally, then local network device 210 may enable auto-negotiation locally, and may restart (e.g., re-initiate) an auto-negotiation process, as described above in connection with block 460.

As an example, auto-negotiation may be disabled and/or not supported on remote network device 220, and auto-negotiation may be disabled on local network device 210. In this case, if the network devices are unable to establish a communication link, local network device 210 may attempt to establish the communication link by enabling auto-negotiation locally and restarting the auto-negotiation process. If this fails, then the network devices may be unable to establish a communication link.

As further shown in FIG. 4B, if auto-negotiation is enabled on the local network device (block 465—YES), then process 400 may include disabling auto-negotiation on the local network device and initiating a process to establish a communication link (block 470). For example, if local network device 210 determines that auto-negotiation is enabled locally, then local network device 210 may disable auto-negotiation locally, and may initiate a link establishment process to establish a communication link with remote network device 220. This link establishment process may not include auto-negotiation.

In some implementations, local network device 210 may perform process 400. Additionally, or alternatively, remote network device 220 may perform process 400. In some implementations, local network device 210 and remote network device 220 may both perform process 400. Additionally, or alternatively, local network device 210 and/or remote network device 220 may perform blocks 440-470 based on expiration of the auto-negotiation timer.

In this way, local network device 210 and remote network device 220 may increase the likelihood of establishing a communication link, even when local network device 210 and remote network device 220 have different auto-negotiation capabilities or settings.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
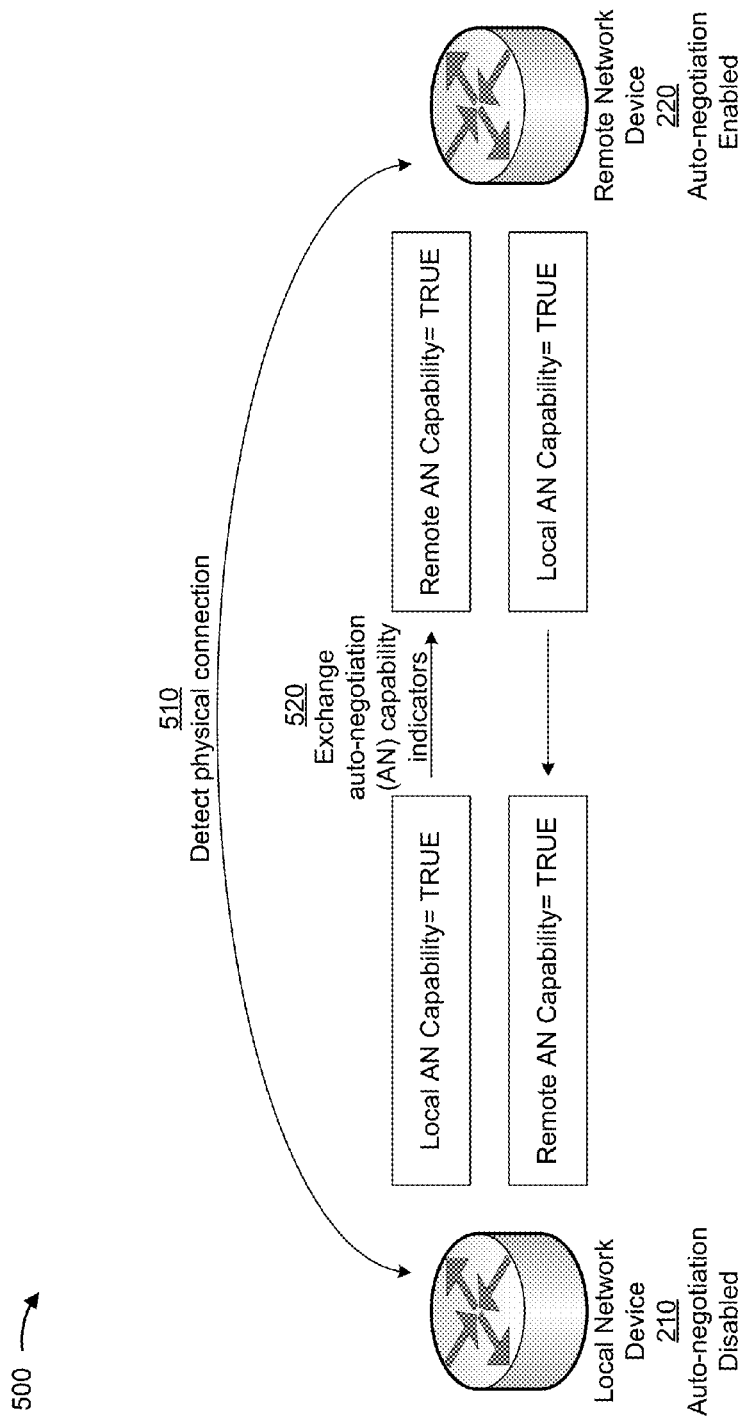
FIGS. 5A and 5B are diagrams of an example implementation relating to the example process shown in FIGS. 4A and 4B.
Figure 5B:
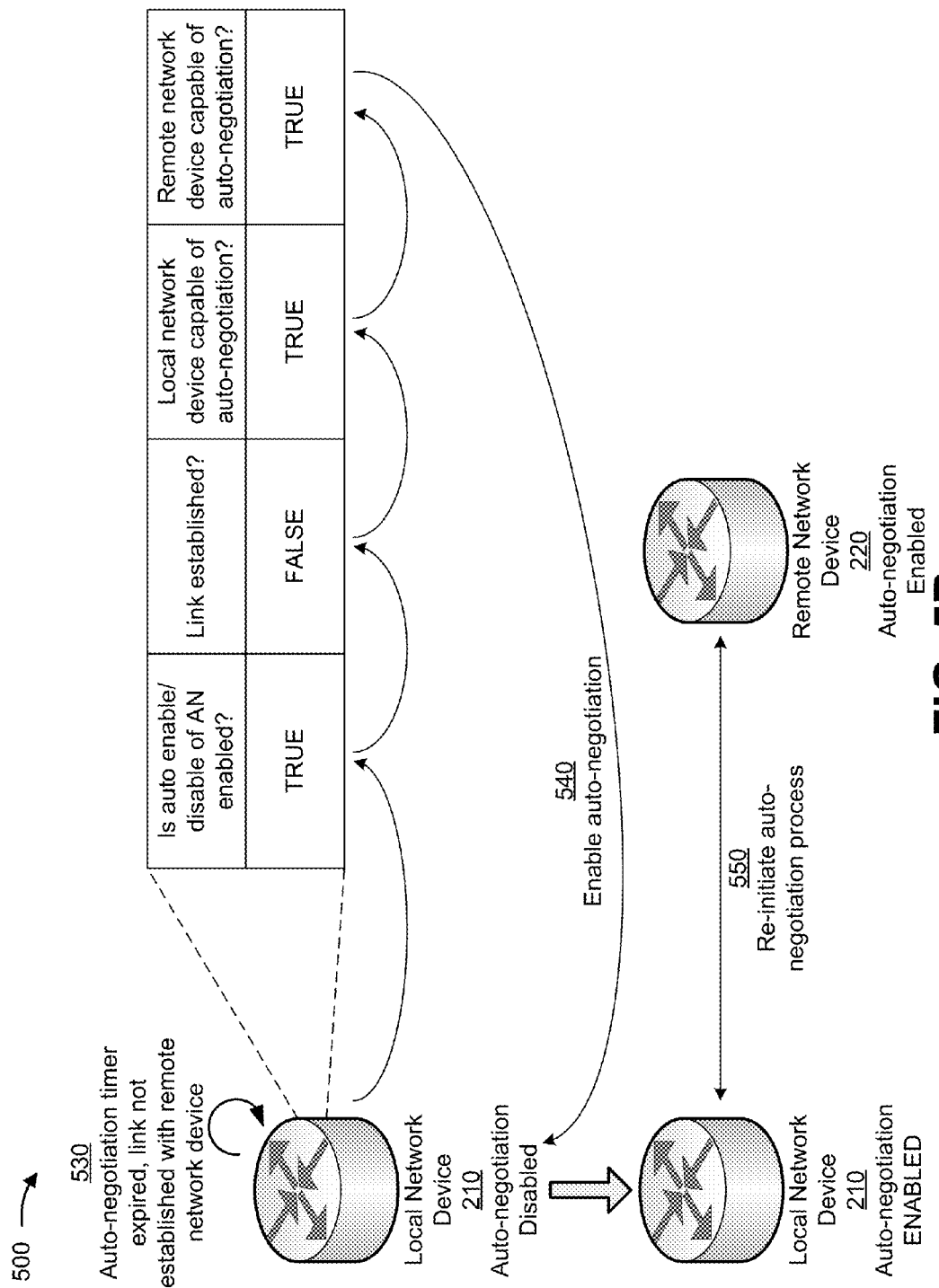

FIGS. 5A and 5B are diagrams of an example implementation 500 relating to example process 400 shown in FIGS.

4A and 4B. FIGS. 5A and 5B show an example of automatic enabling of auto-negotiation between network devices.

As shown in FIG. 5A, assume that local network device 210 (e.g., a router) and remote network device 220 (e.g., another router) are both capable of auto-negotiation. As further shown, assume that local network device 210 has auto-negotiation disabled, and that remote network device 220 has auto-negotiation enabled. As shown by reference number 510, assume that the network devices detect a physical connection with one another (e.g., via an Ethernet cable). Based on detecting the physical connection, assume that the network devices exchange auto-negotiation capability indicators, as shown by reference number 520.

As shown, based on exchanging the information, local network device 210 stores a local auto-negotiation capability indicator of "TRUE," indicating that local network device 210 is capable of auto-negotiation, and also stores a remote auto-negotiation capability indicator of "TRUE," indicating that remote network device 220 is capable of auto-negotiation. As further shown, remote network device 220 stores a local auto-negotiation capability indicator of "TRUE," indicating that remote network device 220 is capable of auto-negotiation, and also stores a remote auto-negotiation capability indicator of "TRUE," indicating that local network device 210 (e.g., which is remote from remote network device 220) is capable of auto-negotiation.

For the purpose of FIG. 5B, assume that local network device 210 and remote network device 220 initialize an auto-negotiation timer, and begin an auto-negotiation process. As shown in FIG. 5B, and by reference number 530, assume that that auto-negotiation process fails, and that the auto-negotiation timer expires without the network devices establishing a communication link. When the auto-negotiation timer expires, local network device 210 reads from memory to determine whether to perform automatic enabling of auto-negotiation (e.g., which is currently disabled on local network device 210). As shown, assume that automatic enabling/disabling of auto-negotiation is enabled on local network device 210 (TRUE), and that a communication link with remote network device 220 has not been established (FALSE). Further, based on the auto-negotiation capability indicators stored as shown in FIG. 5A, local network device 210 determines that local network device 210 is capable of auto-negotiation (TRUE), and that remote network device 220 is capable of auto-negotiation (TRUE).

Based on the above conditions, local network device 210 enables auto-negotiation on local network device 210, as shown by reference number 540. Thus, local network device 210 switches state from auto-negotiation disabled to auto-negotiation enabled. As shown by reference number 550, local network device 210 re-initiates the auto-negotiation process with remote network device 220. Because both network devices now have auto-negotiation enabled, the network devices are now able to exchange transmission capabilities, decide which transmission capabilities to use for a communication link, and establish the communication link. In this way, two network devices that were not previously able to establish a communication link are now able to establish the communication link.

As indicated above, FIGS. 5A and 5B are provided merely as an example. Other examples are possible and may differ from what was described with regard to FIGS. 5A and 5B.

Figure 6A:
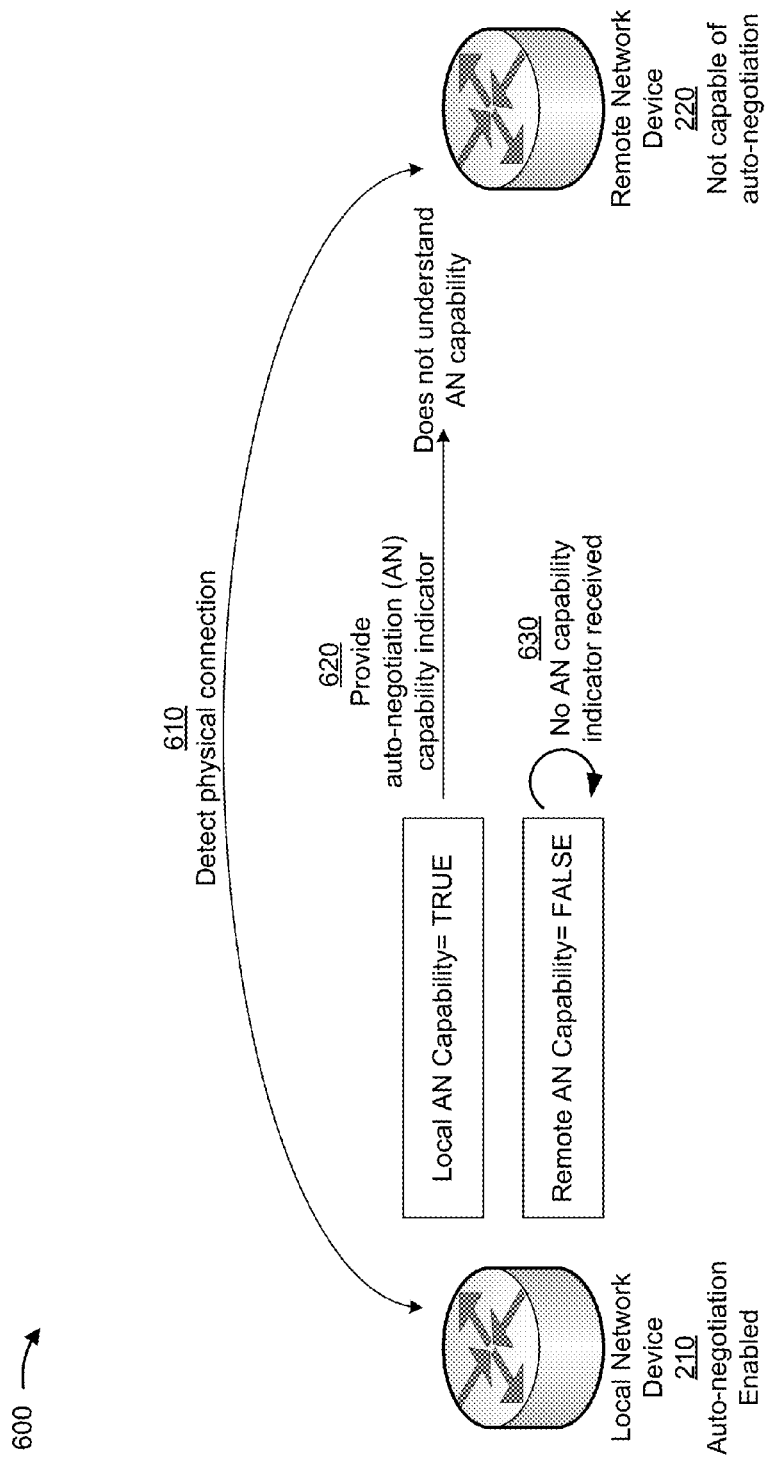
FIGS. 6A and 6B are diagrams of another example implementation relating to the example process shown in FIGS. 4A and 4B.
Figure 6B:
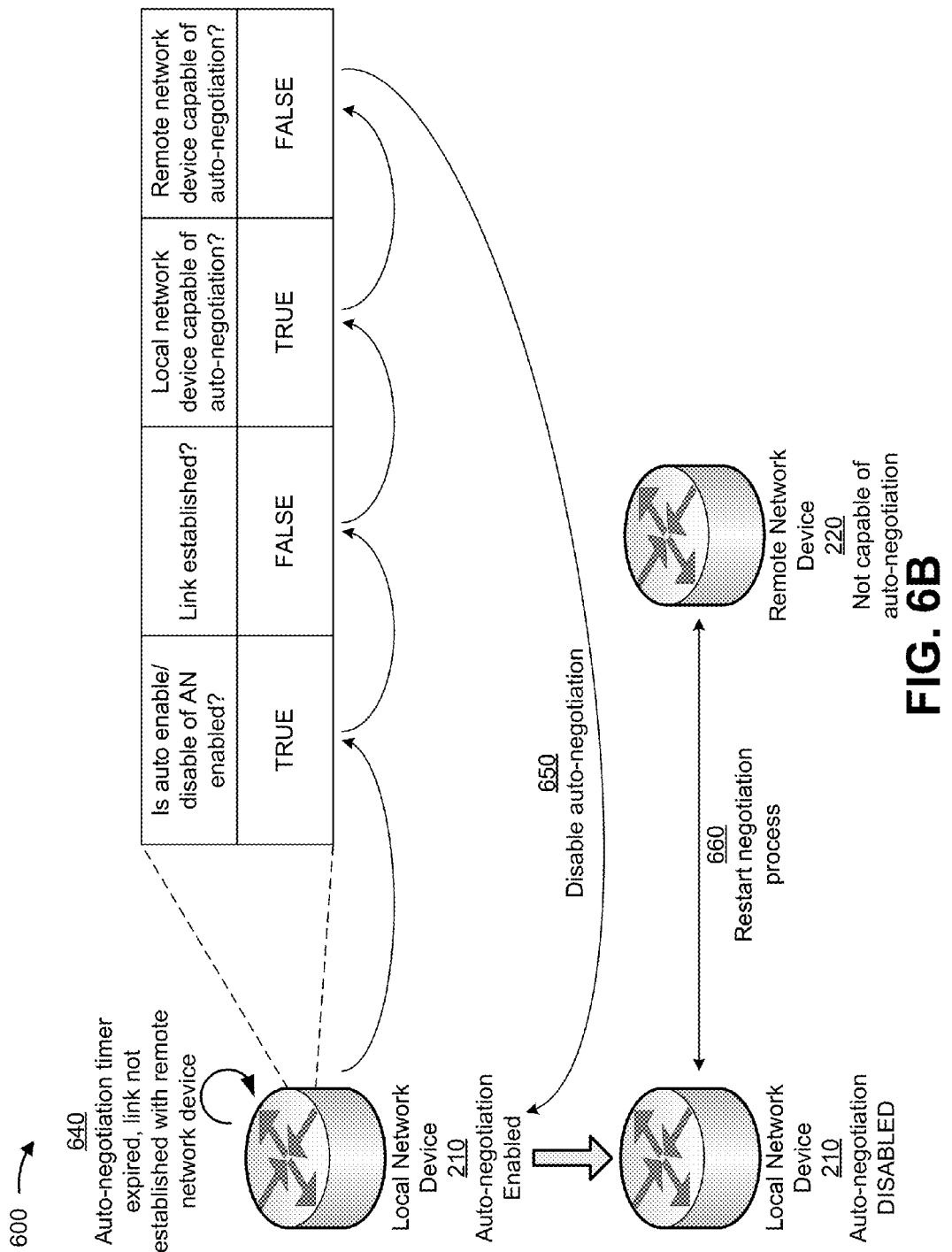

FIGS. 6A and 6B are diagrams of another example implementation 600 relating to example process 400 shown in FIGS. 4A and 4B. FIGS. 6A and 6B show an example of automatic disabling of auto-negotiation between network devices.

As shown in FIG. 6A, assume that local network device 210 is capable of auto-negotiation, and that remote network device 220 is not capable of auto-negotiation. As further shown, assume that local network device 210 has auto-negotiation enabled. As shown by reference number 610, assume that the network devices detect a physical connection with one another (e.g., via an Ethernet cable).

Based on detecting the physical connection, assume that local network device 620 provides an auto-negotiation capability indicator to remote network device 220, as shown by reference number 620. However, since remote network device 220 does not support auto-negotiation, remote network device 220 may not understand the indicator, and may ignore the indicator. Alternatively, remote network device 220 may store the indicator, which may be used in the future in case remote network device 220 is later configured to support auto-negotiation.

As shown by reference number 630, assume that local network device 210 does not receive an auto-negotiation capability indicator from remote network device 220 (e.g., because remote network device 220 does not support auto-negotiation). For example, local network device 210 may request the auto-negotiation capability indicator from remote network device 220, and may determine that the auto-negotiation capability indicator has not been received within a threshold amount of time since the request was sent. In this case, local network device 210 stores a remote auto-negotiation capability indicator of "FALSE," indicating that remote network device 220 is not capable of auto-negotiation. Alternatively, remote network device 220 may provide an auto-negotiation capability indicator to local network device 210, and the auto-negotiation capability indicator may indicate that remote network device 220 is not capable of auto-negotiation.

For the purpose of FIG. 6B, assume that local network device 210 and remote network device 220 initialize an auto-negotiation timer, and begin an auto-negotiation process. As shown in FIG. 6B, and by reference number 640, assume that that auto-negotiation process fails, and that the auto-negotiation timer expires without the network devices establishing a communication link. When the auto-negotiation timer expires, local network device 210 reads from memory to determine whether to perform automatic disabling of auto-negotiation (e.g., which is currently enabled on local network device 210). As shown, assume that automatic enabling/disabling of auto-negotiation is enabled on local network device 210 (TRUE), and that a communication link with remote network device 220 has not been established (FALSE). Further, based on the auto-negotiation capability indicators stored as shown in FIG. 6A, local network device 210 determines that local network device 210 is capable of auto-negotiation (TRUE), and that remote network device 220 is not capable of auto-negotiation (FALSE).

Based on the above conditions, local network device 210 disables auto-negotiation on local network device 210, as shown by reference number 650. Thus, local network device 210 switches state from auto-negotiation enabled to auto-negotiation disabled. As shown by reference number 660, local network device 210 restarts a negotiation process with remote network device 220. Because local network device 210 now has auto-negotiation disabled, and because remote network device 220 is not capable of auto-negotiation, the negotiation process does not involve auto-negotiation (e.g., local network device 210 may not provide transmission capabilities to remote network device 220). The network devices are now able to establish a communication link without any errors that may result from unsupported auto-negotiation. In this way, two network devices that were not previously able to establish a communication link are now able to establish the communication link.

As indicated above, FIGS. 6A and 6B are provided merely as an example. Other examples are possible and may differ from what was described with regard to FIGS. 6A and 6B.

Implementations described herein assist in establishing communication links between network devices with different auto-negotiation capabilities or settings by automatically enabling or disabling auto-negotiation on a network device. This may assist in increasing interoperability between network devices, and may reduce the amount of manual intervention needed to configured network devices in a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with a threshold. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
one or more processors to:
determine a first auto-negotiation capability associated with the first network device,
the first auto-negotiation capability indicating whether the first network device is configured to establish a communication link with a second network device using auto-negotiation of one or more transmission capabilities;
determine a second auto-negotiation capability associated with the second network device,
the second auto-negotiation capability indicating whether the second network device is configured to establish the communication link with the first network device using auto-negotiation of the one or more transmission capabilities;
initiate an auto-negotiation timer for an auto-negotiation process between the first network device and the second network device;
determine that the auto-negotiation timer has expired;
determine, based on determining that the auto-negotiation timer has expired, that the auto-negotiation process failed to establish the communication link between the first network device and the second network device; and
selectively enable or disable auto-negotiation on the first network device based on determining that the auto-negotiation process failed, and further based on the first auto-negotiation capability and the second auto-negotiation capability.

2. The first network device of claim 1, where the one or more processors are further to:
determine, based on the second auto-negotiation capability, that the second network device is configured to establish the communication link with the first network device using auto-negotiation; and
where the one or more processors, when selectively enabling or disabling auto-negotiation on the first network device, are further to:
enable auto-negotiation on the first network device based on determining that the second network device is configured to establish the communication link with the first network device using auto-negotiation.

3. The first network device of claim 1, where the one or more processors are further to:
determine, based on the second auto-negotiation capability, that the second network device is not configured to establish the communication link with the first network device using auto-negotiation; and
where the one or more processors, when selectively enabling or disabling auto-negotiation on the first network device, are further to:
disable auto-negotiation on the first network device based on determining that the second network device is not configured to establish the communication link with the first network device using auto-negotiation.

4. The first network device of claim 1, where the one or more processors are further to:
determine that auto-negotiation is disabled on the first network device; and
where the one or more processors, when selectively enabling or disabling auto-negotiation on the first network device, are further to:
enable auto-negotiation on the first network device based on determining that auto-negotiation is disabled on the first network device.

5. The first network device of claim 1, where the one or more processors are further to:
   determine that auto-negotiation is enabled on the first network device; and
   where the one or more processors, when selectively enabling or disabling auto-negotiation on the first network device, are further to:
      disable auto-negotiation on the first network device based on determining that auto-negotiation is enabled on the first network device.

6. The first network device of claim 1, where the one or more processors are further to:
   initiate a link establishment process after selectively enabling or disabling auto-negotiation on the first network device,
      the link establishment process causing the first network device and the second network device to attempt to establish the communication link.

7. The first network device of claim 1, where the one or more processors are further to:
   receive, from the second network device, an auto-negotiation capability indicator,
      the auto-negotiation capability indicator indicating whether the second network device is configured to establish the communication link with the first network device using auto-negotiation of the one or more transmission capabilities; and
   where the one or more processors, when determining the second auto-negotiation capability, are further to:
      determine the second auto-negotiation capability based on the auto-negotiation capability indicator.

8. A non-transitory computer-readable medium storing instructions, the instructions comprising:
   one or more instructions that, when executed by one or more processors, cause the one or more processors to:
      receive, from a remote network device, a remote auto-negotiation capability indicator,
         the remote auto-negotiation capability indicator indicating whether the remote network device is configured to establish communication links with other network devices using auto-negotiation;
      store the remote auto-negotiation capability indicator as a stored remote auto-negotiation capability indicator;
      initiate an auto-negotiation timer for an auto-negotiation process;
      determine that the auto-negotiation timer has expired;
      determine, based on determining that the auto-negotiation timer has expired, that the auto-negotiation process failed to establish a communication link with the remote network device; and
      selectively enable or disable auto-negotiation based on determining that the auto-negotiation process failed, and further based on the stored remote auto-negotiation capability indicator.

9. The non-transitory computer-readable medium of claim 8, where the remote auto-negotiation capability indicator indicates that auto-negotiation is enabled on the remote network device;
   where the one or more instructions, when executed by the one or more processors, further cause the one or more processors to:
      determine, based on the remote auto-negotiation capability indicator, that the remote network device is configured to establish communication links with other network devices using auto-negotiation; and
   where the one or more instructions, that cause the one or more processors to selectively enable or disable auto-negotiation, further cause the one or more processors to:
      enable auto-negotiation based on determining that the remote network device is configured to establish communication links with other network devices using auto-negotiation.

10. The non-transitory computer-readable medium of claim 8, where the remote auto-negotiation capability indicator indicates that auto-negotiation is disabled on the remote network device;
   where the one or more instructions, when executed by the one or more processors, further cause the one or more processors to:
      determine, based on the remote auto-negotiation capability indicator, that the remote network device is not configured to establish the communication links with the other network devices using auto-negotiation; and
   where the one or more instructions, that cause the one or more processors to selectively enable or disable auto-negotiation, further cause the one or more processors to:
      disable auto-negotiation based on determining that the remote network device is not configured to establish the communication links with the other network devices using auto-negotiation.

11. The non-transitory computer-readable medium of claim 8, where the remote auto-negotiation capability indicator indicates that auto-negotiation is not supported by the remote network device;
   where the one or more instructions, when executed by the one or more processors, further cause the one or more processors to:
      determine, based on the remote auto-negotiation capability indicator, that the remote network device is not configured to establish the communication links with the other network devices using auto-negotiation; and
   where the one or more instructions, that cause the one or more processors to selectively enable or disable auto-negotiation, further cause the one or more processors to:
      disable auto-negotiation based on determining that the remote network device is not configured to establish the communication links with the other network devices using auto-negotiation.

12. The non-transitory computer-readable medium of claim 8, where the one or more instructions, when executed by the one or more processors, further cause the one or more processors to:
   determine whether automatic enabling or disabling of auto-negotiation is enabled; and
   where the one or more instructions, that cause the one or more processors to selectively enable or disable auto-negotiation, further cause the one or more processors to:
      selectively enable or disable auto-negotiation based on determining whether the automatic enabling or disabling of auto-negotiation is enabled.

13. The computer-readable medium of claim 8, where the one or more instructions, when executed by the one or more processors, further cause the one or more processors to:
   detect a wired connection with the remote network device; and request, via the wired connection, the remote auto-negotiation capability indicator.

14. The non-transitory computer-readable medium of claim 8, where the one or more instructions, when executed by the one or more processors, further cause the one or more processors to:
perform a link establishment process with the remote network device after selectively enabling or disabling auto-negotiation,
the link establishment process including auto-negotiation when auto negotiation has been enabled, or
the link establishment process not including auto-negotiation when auto negotiation has been disabled.

15. A method, comprising:
determining, by a first network device, a first auto-negotiation capability associated with the first network device,
the first auto-negotiation capability indicating whether the first network device is configured to establish communication links using auto-negotiation of transmission capabilities;
determining, by the first network device, a second auto-negotiation capability associated with a second network device that is connected to the first network device,
the second auto-negotiation capability indicating whether the second network device is configured to establish the communication links using auto-negotiation of transmission capabilities;
initiating, by the first network device, an auto-negotiation timer for an auto-negotiation process between the first network device and the second network device;
determining, by the first network device, that the auto-negotiation timer has expired;
determining, by the first network device and based on determining that the auto-negotiation timer has expired, that the auto-negotiation process has failed to establish a communication link between the first network device and the second network device; and
selectively enabling or disabling, by the first network device, auto-negotiation on the first network device based on determining that the auto-negotiation process has failed, and further based on the first auto-negotiation capability and the second auto-negotiation capability.

16. The method of claim 15, further comprising:
determining, based on the second auto-negotiation capability, that the second network device is configured to establish the communication links using auto-negotiation of transmission capabilities;
where selectively enabling or disabling auto-negotiation on the first network device comprises:
enabling auto-negotiation on the first network device based on determining that the second network device is configured to establish the communication links using auto-negotiation of transmission capabilities.

17. The method of claim 15, further comprising:
determining, based on the second auto-negotiation capability, that the second network device is not configured to establish the communication links using auto-negotiation of transmission capabilities;
where selectively enabling or disabling auto-negotiation on the first network device comprises:
disabling auto-negotiation on the first network device based on determining that the second network device is not configured to establish the communication links using auto-negotiation of transmission capabilities.

18. The method of claim 15, further comprising:
determining that auto-negotiation is disabled on the first network device;
where selectively enabling or disabling auto-negotiation on the first network device comprises:
enabling auto-negotiation on the first network device based on determining that auto-negotiation is disabled on the first network device.

19. The method of claim 15, further comprising:
determining that auto-negotiation is enabled on the first network device;
where selectively enabling or disabling auto-negotiation on the first network device comprises:
disabling auto-negotiation on the first network device based on determining that auto-negotiation is enabled on the first network device.

20. The method of claim 15, where determining the second auto-negotiation capability comprises:
requesting an auto-negotiation capability indicator from the second network device;
determining that a threshold amount of time has elapsed without receiving the auto-negotiation capability indicator from the second network device; and
determining the second auto-negotiation capability based on determining that the threshold amount of time has elapsed without receiving the auto-negotiation capability indicator from the second network device.

* * * * *

UNITED STATES PATENT AND TRADEMARK OFFICE
CERTIFICATE OF CORRECTION

PATENT NO. : 9,480,097 B1
APPLICATION NO. : 14/497610
DATED : October 25, 2016
INVENTOR(S) : Shubhadeep Ghosh et al.

It is certified that error appears in the above-identified patent and that said Letters Patent is hereby corrected as shown below:

In the Claims

Please correct Claim 13 as follows:

Column 16, line 63, change "The computer-readable medium" to --The non-transitory computer-readable medium--

Signed and Sealed this
Twentieth Day of December, 2016

Michelle K. Lee
*Director of the United States Patent and Trademark Office*